United States Patent [19]

Suguri et al.

[11] 4,438,063

[45] Mar. 20, 1984

[54] PRESS ROLL AND MANUFACTURING METHOD THEREFOR

[75] Inventors: Masayoshi Suguri, Fujisawa; Kazuo Yamada, Kawasaki; Masaaki Nandate, Tokyo, all of Japan

[73] Assignee: Kinyosha Co., Ltd., Tokyo, Japan

[21] Appl. No.: 217,139

[22] Filed: Dec. 17, 1980

[51] Int. Cl.³ .............................................. C08K 3/34
[52] U.S. Cl. ...................................... 264/311; 29/132; 264/279; 264/275; 524/871; 524/873; 524/875
[58] Field of Search ...................... 29/132, 125, 129.5; 524/871, 873, 875; 264/275, 279, 311

[56] References Cited

U.S. PATENT DOCUMENTS

| | | | |
|---|---|---|---|
| 2,983,990 | 5/1961 | Stevenson et al. | 29/132 |
| 3,087,231 | 4/1963 | Martin et al. | 29/129.5 |
| 3,470,121 | 9/1969 | Cobbledick | 524/871 |
| 3,673,025 | 6/1972 | Fukuyama et al. | 29/132 |
| 3,705,072 | 12/1972 | Rosvold | 29/132 |
| 3,757,398 | 9/1973 | Urban | 29/132 |
| 3,983,065 | 9/1976 | Olstowski | 524/874 |
| 4,256,034 | 3/1981 | Kusters et al. | 29/132 |

FOREIGN PATENT DOCUMENTS 48-18939 9/1973 Japan.

OTHER PUBLICATIONS

Adiprene Bulletin No. 1, Adiprene L-315, Apr. 1963, Development Products Report No. 10, Mar. 15, 1958.

*Primary Examiner*—Lewis T. Jacobs
*Attorney, Agent, or Firm*—Oblon, Fisher, Spivak, McClelland & Maier

[57] ABSTRACT

A press roll comprises an inorganic powder and a polyurethane obtainable by reacting an organic isocyanate and an organic compound having a functional group which reacts therewith. This roll is preferably used as a top press roll for manufacturing paper.

10 Claims, 4 Drawing Figures

PRESS ROLL AND MANUFACTURING METHOD THEREFOR

BACKGROUND OF THE INVENTION

The present invention relates to a press roll, especially a substitute for a paper machine roll made of granite, and to a method for manufacturing the same.

During the manufacture of paper, pulp or wet web of paper is pressed and dehydrated as it is continuously passed between a bottom press roll and a top press roll while placed on felt material. A rubber roll is generally used as the bottom press roll which is brought into contact with the felt material. However, the top press roll is directly contacted with the wet paper for excerting high load, and is thus required for the special features below:

(1) Good release property from the paper
(2) Resistance to high loads
(3) Smooth surface
(4) Less deformation of the roll not to break the paper when the wet paper is pressed.

A top press roll made of granite called a stone roll shows good release property from paper. However, since the granite is a natural material, variation in the quality is great, and much labor and time are required for forming the granite into rolls. The production period of large rolls is especially unstable due to difficulties in obtaining large granite. The granite roll is further disadvantageous in that impacts tend to cause scars. As an alternative, a paper machine roll is known which contains stone powder such as quartz sand in hard rubber. Although this type of top press roll is advantageous in that the elongation is large and the cost is lower, the release property from the paper is insufficient and the separation of the stone powder during use accelerates roughness on the surface.

SUMMARY OF THE INVENTION

It is, therefore, the primary object of the present invention to provide a press roll and a method for manufacturing the same according to which the release property from paper is superior, the physical strength is good, and the smoothness of the roll surface is kept up.

According to one aspect of the present invention, there is provided a press roll made of a polyurethane resin obtainable by reacting an organic isocyanate with a compound having a functional group which reacts therewith and containing an inorganic material powder.

According to the above-mentioned roll, the polyurethane is a non-cellular hard polyurethane preferably having a hardness of over 70° (Shore D).

According to the present invention, for manufacturing a desired press roll, it is advantageous that at least 10% by weight of the organic compound having a functional group which reacts with the organic isocyanate be a polyether having more than three functional groups and that the polyether have a hydroxyl value of 200 to 800.

The inorganic material powder may be used in an amount of 5 to 300 parts by weight based on the total weight of the organic isocyanate and the organic compound having the functional group which reacts therewith. The particularly preferable amount of the inorganic powder to be used is 100 to 250 parts by weight based on the total weight. The particle size of the inorganic powder used is preferably 30 to 300 Tyler mesh.

The above-mentioned inorganic powder includes stone powders such as granite powder and quartz sand. The stone powder contains as a main component $SiO_2$ and/or $Al_2O_3$.

The press roll of the present invention preferably has a core body such as an iron bar which extends through its center and is coupled to the roll.

However, according to the present invention, the core body does not necessarily extend through the center of the roll but may be secured at both sides of the roll by a suitable fixing means.

According to another aspect of the present invention, there is provided a method for manufacturing a press roll which comprises the step of reacting an organic isocyanate with an organic compound having a functional group which reacts therewith in the presence of an inorganic powder and in the absence of a foaming agent to form a cylinder made of the polyurethane containing said inorganic powder.

The method may further include the step of connecting a core body to the cylinder.

The connection of the cylinder to the core body may be performed simultaneously with the formation of the cylinder by carrying out the above reaction in a mold having a core body to which is applied an adhesive.

The cylinder may be formed by centrifugal casting. The cylinder may alternatively be formed by preparing the composition for producing the polyurethane resin of the present invention in a state having a viscosity comparable to a paste, continuously supplying the paste to the surface of a rotating drum, and forming a roll according to a knife coating method using a doctor knife. When introducing the composition for producing the polyurethane resin and reacting in a mold, the inorganic powder may be introduced later alone, and the reaction may continue while the inorganic powder is deposited.

It is preferable to dehydrate by heating the compound having a functional group which reacts with the organic isocyanate, before reacting it with the organic isocyanate. The reaction for providing the polyurethane resin is preferably carried out at a temperature below 150° C.

DETAILED DESCRIPTION OF THE PREFERRED EMBODIMENTS

The polyether having more than 3 functional groups to be used in the present invention may include the following organic compounds. For example, polyethers including a terminal hydroxyl group obtained by adding one or more of ethylene oxide, propylene oxide, butylene oxide, and so on to glycerine, trimethylolpropane, hexantriol, ethylenediamine, toluenediamine, pentaerythritol, sorbitol, sucrose and so on.

The organic isocyanate to be used in the present invention may include toluene diisocyanate, xylene diisocyanate, hexamethylene diisocyanate, methylenebisphenyl isocyanate, crude methylenebisphenyl isocyanate obtainable by conventional methods, diphenyl ether diisocyanate, methylenebiscyclohexyl isocyanate isophorone diisocyanate, and so on.

In addition to the above-mentioned polyethers this invention may use organic compounds which include polyols such as polyoxypropylene glycol, polyoxyethylenepropylene glycol, polyoxytetramethylene glycol, ethylene glycol, propylene glycol, dipropylene glycol, neopentyl glycol, and oxyalkylene ether of bisphenol type; amines such as methylenebis-o-chloroaniline, toluenediamine, pentadine, hexamethylenediamine, and diphenyl-m-diamine; saturated polyester and polyether having an OH group.

The present invention will be more fully understood from the Tests given below.

Test 1

A casting mold was prepared through which extended an iron core applied with Conap 1146 (trade name of phenolic resin manufactured by Conap Co.) as an adhesive. Sannix HD 402 (trade name of a polyether manufactured by Sanyo Chemical Industry) which was dehydrated at a temperature of 120° C. was placed in a mixer in an amount of 100 parts by weight. An amount of 110 parts by weight of Isonate 143 L (trade name of an organic isocyanate manufactured by Up-John Company) was added simultaneously with 357 parts by weight of dry quarty sand powder of 80 to 120 Tyler mesh. After being agitated for 5 minutes under reduced pressure, the mixture was poured into the casting mold. The mixture was heated at 80° C. for 5 hours for curing, and the cured material was taken out of the mold. The surface of the cured material was grinded according to the conventional method to provide a press roll according to this example of the present invention. The Sannix HD 402 is a polyether which is obtained by adding propylene oxide to pentaerythritol. This material has a hydroxyl value of 394, a molecular weight of 569, 4 functional groups, and a viscocity of 1,775 centipoise at 25° C. The abovementioned Isonate 143 L is a diphenyl methene diisocyanate which is carbodiimidized and has an NCO content of 29.2%. The ratio of NCO/OH is 1.08.

Figure 1:
FIG. 1 is a photograph taken by an electron microscope (scale: 100 times) showing the surface condition of the press roll of the present invention before use.

Photograph of the surface of the above press roll before use (scale: 100 times) is shown in FIG. 1. As may be apparent from FIG. 1, the stone powder is strongly bonded to the polyurethane resin, and the stone powder is not exposed from the resin.

Figure 2:
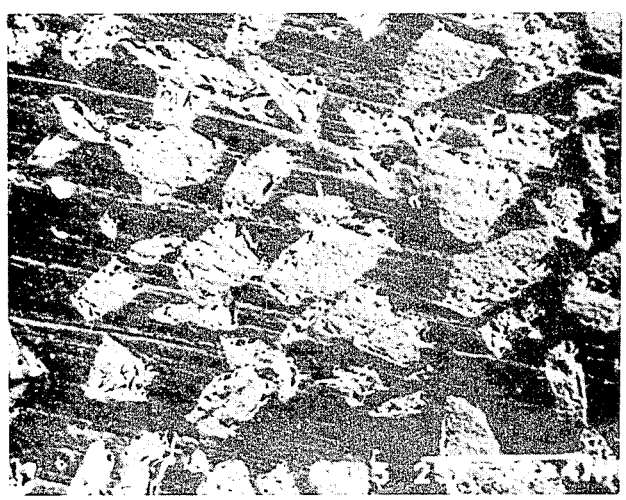
FIG. 2 is a photograph taken by an electron microscope (scale: 100 times) of the press roll of FIG. 1 after use.

FIG. 2 shows a photograph taken by an electron microscope (scale: 100 times) of the surface of the roll after rotation test. The roll rotation test is carried at rotational frequency of 715 rpm and a pressure of 110 kg/cm for a period of 16 hours. As may be apparent from FIG. 2, the polyurethane resin which covered the stone powder becomes abraded and exposes the stone powder. However, since the adhesion between the polyurethane resin and the stone powder is strong, it is seen that the stone powder does not separate but becomes cracked.

The strong adhesion between the polyurethane resin and the stone powder may be attributed to the presence of a silanol group, which is a functional group having an active hydrogen, on the surface of the stone powder. This silanol group reacts with the NCO group of the organic isocyanate.

Test 2

The material of the composition shown below was mixed in an open mill according to the conventional method and was formed into a rubber sheet using a calender roll. This rubber sheet was vulcanized after building up it on an iron core having an ebonite layer on its surface, and fastening it with a lapping cloth. The press roll of Test 2 was obtained as a comparative example after finally performing surface grinding.

| Composition | Parts by weight |
|---|---|
| Natural rubber | 100 |
| Flowers of zinc | 5 |
| Sulfur fine powder | 33 |
| Vulcanization accelerator | 0.6 |
| Ebonite powder | 80 |
| Quartz sand powder (80 to 120 mesh) | 150 |

Figure 3:
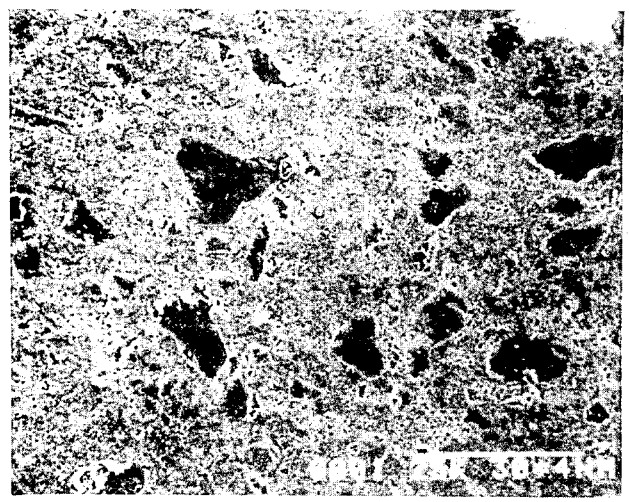
FIG. 3 is a photograph taken by an electron microscope (scale: 100 times) showing the surface condition of a conventional press roll of hard rubber with quartz sand powder added before use.
Figure 4:
FIG. 4 is a photograph taken by an electron microscope (scale 100 times) of another part of the surface of the press roll of FIG. 3 before use.

FIG. 3 shows a photograph taken by an electron microscope (scale: 100 times) of the press roll of Test 2 above. As may be apparent from FIG. 3, the stone powder is exposed because the hard rubber has poor adhesion with stone. Therefore, FIG. 4 shows a photograph taken by an electron microscope (scale: 100 times) of the surface of the roll of FIG. 3 at another place. As may be seen from FIG. 4, part of the stone is fallen off from the hard rubber.

The rolls of the above tests were tested together with a roll of granite with a Fourdrinier paper machine. The results are shown in Tests 3 and 4.

Test 3

In this test, a compact Fourdrinier paper machine (two-stage press) as shown in Table 1 below was used. The manufactured pulp consisted of 25% by weight of needle-leafed tree, 75% by weight of broadleaf tree, and 1% by weight of a sizing agent. The pulp was adjusted to pH 4.5 by aluminum sulfate. The freeness was 340 ml and the basis weight was 70 g/m$^2$.

TABLE 1

| | No. 1 Press |
|---|---|
| Pressure (kg/cm) | 40 |
| Top press roll | Test rolls |
| Bottom press roll | Plane roll consisting of synthetic rubber 90° (JIS A) |

The test rolls (granite roll, and rolls of Tests 1 and 2) used as the top press rolls of the No. 1 press had a 330 mm outer diameter, and a 560 mm length. The roll of granite, and the rolls of Tests 1 and 2 had hardnesses of 99°, 93° and 90° (shore D), respectively. The doctor knife of stainless steel was brought into contact with the test roll, and the amount of paper deposited on the doctor knife in 10 minutes was measured. The results are shown in Table 2 below.

TABLE 2

| | Test 1 | Granite | Test 2 |
|---|---|---|---|
| Amount of paper deposited on the doctor knife in (10 minutes) (in grams after drying) | 1.7<br>1.6 | 1.6<br>1.6 | 2.6<br>2.3 |
| Mean value | 1.65 | 1.6 | 2.45 |

When the amount of paper deposited on the doctor knife is small, the roll is generally judged to have good release property from paper. When the amount of paper is great, the release property is judged to be poor. As may be apparent from Table 2 above, the press roll of the present invention has a release property equivalent to the roll of granite and superior to the roll of Test 2. When observations were made for the position at which the paper separated from the test roll, there was no variation in the position where the paper separated from the roll in the cases of the Test 1 roll and the granite roll. However, with the Test 2 roll, the position where the paper separated from the roll varied, and the paper was in contact with the roll for a longer period of time. Thus it was concluded that the release property from paper was inferior.

Test 4

The separation from paper was tested using a larger Fourdrinier paper machine (3-stage press) than that used in Test 3. The pulp used consisted of 100 parts by weight of craft pulp of broadleaf trees, 1 part by weight of alumina sulfate, and 8 parts by weight of talc. The freeness was 500 ml and the basis weight was 80 gr/m$^2$.

With such a paper machine, test rolls of 545 mm×505 mm×3,500 mm were used as top rolls of the No. 1 press. The materials for these top rolls were those of Tests 1 and 2, and granite. The pressure and the speed of the rolls were 60 kg/cm and 500 m/min, respectively.

The manufacture of paper was easy with the roll of granite and the roll of Test 1 of the present invention. However, the paper was frequently broken with the roll of Test 2, so that it could not be operated.

With the press roll of the present invention, since the inorganic powder and the poly-urethane resin are strongly bonded together, the physical strength is great and the load resistance is superior. The smoothness of the roll surface is kept up and the release property from paper is good. Further, since it is possible to add a large amount of inorganic powder to the liquid polyurethane composition, control of the reaction heat becomes easy, the vulcanization shrinkage becomes small, and the formability is improved.

Although the press roll of the present invention is preferably used as a press roll for the manufacture of paper, it is not limited to this but may be used for other purposes such as a press roll for dry-type copier.

What we claim is:

1. A press roll, comprising:
   an inorganic stone powder containing as a main component $SiO_2$, $Al_2O_3$, or a mixture of $SiO_2$ and $Al_2O_3$; and,
   a non-cellular polyurethane having a Shore D hardness of over 70° which is obtained by reacting an organic isocyanate with one or more organic compounds having a functional group which reacts with said isocyanate, wherein at least 10% by weight of said organic compounds comprises a polyether having more than three functional groups.

2. A press roll according to claim 1, wherein said polyether is a polyether having a hydroxyl value of 200 to 800.

3. A press roll according to claim 1, wherein the inorganic powder is used in an amount of 5 to 300 parts by weight based on the total weight of the organic isocyanate and the organic compound having a functional group which reacts therewith.

4. A press roll according to claim 1, wherein the particle size of the inorganic powder is 30 to 300 Tyler mesh.

5. A press roll according to claim 1, wherein the inorganic powder is a stone powder.

6. A press roll according to claim 1, wherein said press roll further has a core body.

7. A method for manufacturing the press roll of claim 1 which comprises the step of reacting an organic isocyanate with an organic compound having a functional group which reacts therewith in the presence of said inorganic powder and in the absence of a foaming agent to form a cylinder made of the polyurethane resin containing said inorganic powder.

8. A method according to claim 7, further comprising the step of connecting a core body to said cylinder.

9. A method according to claim 8, wherein the connection of the core body to the cylinder is performed simultaneously with the formation of the cylinder by carrying out said reaction in a mold having a core body to which is applied an adhesive.

10. A method according to claim 7, wherein said cylinder is formed by centrifugal casting.

* * * * *